United States Patent
Petrus et al.

(10) Patent No.: US 6,839,574 B2
(45) Date of Patent: Jan. 4, 2005

(54) METHOD AND APPARATUS FOR ESTIMATING DOWNLINK BEAMFORMING WEIGHTS IN A COMMUNICATIONS SYSTEM

(75) Inventors: Paul Petrus, Santa Clara, CA (US); Antoine Chemali, San Francisco, CA (US); David Depierre, Paris (FR); Louis C. Yun, Santa Clara, CA (US)

(73) Assignee: ArrayComm, Inc., San Jose, CA (US)

(*) Notice: Subject to any disclaimer, the term of this patent is extended or adjusted under 35 U.S.C. 154(b) by 454 days.

(21) Appl. No.: 09/745,343

(22) Filed: Dec. 20, 2000

(65) Prior Publication Data

US 2002/0090978 A1 Jul. 11, 2002

(51) Int. Cl.[7] .............................. H04B 1/38; H04M 1/00
(52) U.S. Cl. ............................... 455/562.1; 455/277.2; 455/278.1; 455/67.11
(58) Field of Search ................................ 455/101, 560, 455/506, 423, 133, 522, 303, 134, 561, 277.2, 278.1, 513, 275, 562.1, 456.5, 67.11, 66.1; 342/378, 417

(56) References Cited

U.S. PATENT DOCUMENTS

| | | | | |
|---|---|---|---|---|
| 6,031,877 A | * | 2/2000 | Saunders | 455/226.2 |
| 6,122,260 A | | 9/2000 | Liu et al. | |
| 6,331,837 B1 | * | 12/2001 | Shattil | 342/378 |
| 6,377,812 B1 | * | 4/2002 | Rashid-Farrokhi et al. | 455/522 |
| 6,404,803 B1 | * | 6/2002 | Wang et al. | 455/303 |
| 6,411,257 B1 | * | 6/2002 | Sorelius et al. | 455/132 |
| 6,477,161 B1 | * | 11/2002 | Hudson et al. | 455/562.1 |
| 2002/0051433 A1 | * | 5/2002 | Affes et al. | 370/335 |

FOREIGN PATENT DOCUMENTS

GB  2 349 045 A  10/2000

OTHER PUBLICATIONS

PCT International Search Report for International Application No. PCT/US01/31123, International Searching Authority, European Patent Office, Mar. 5, 2002.

G. Xu and H. Lui, "An effective transmission beamforming scheme for frequency division duplex digital wireless communications systems", in *Proc. of ICASSP*, 1995, pp. 1729–1732.

D. Gerlach and A. Paulraj, "Base station transmitting antenna arrays with mobile to base feedback", in *Proc. of IEEE Asilomar Conf.*, Nov. 1993, pp. 1432–1436.

M. Rias, "Direction of arrival estimation using antenna arrays", in *Masters Thesis*, Jan. 1996, Virginia Tech, VA., pp. 64–71.

A. Paulraj, R. Roy, and T. Kailtath, "A subspace rotation approach to signal parameter estimation", in *Proc. IEEE*, Jul. 1986, vol. 74(7) pp. 1044–1045.

* cited by examiner

*Primary Examiner*—Nay Maung
*Assistant Examiner*—John J Lee
(74) *Attorney, Agent, or Firm*—Blakely Sokoloff Taylor & Zafman LLP (57) ABSTRACT

A downlink beamforming apparatus and method. In one embodiment, a method in accordance with the teachings of the present invention includes receiving uplink communication signals from a plurality of antenna array elements, selecting an operating condition of an environment and estimating downlink beamforming weights used in downlink communication signals in response to the selected operation condition of the environment.

14 Claims, 6 Drawing Sheets

METHOD AND APPARATUS FOR ESTIMATING DOWNLINK BEAMFORMING WEIGHTS IN A COMMUNICATIONS SYSTEM

RELATED APPLICATION

This application is related to co-pending application Ser. No. 09/668,664, filed Sep. 22, 2000, entitled "Method and Apparatus For Determining An Operating Condition In A Communications System," and assigned to the Assignee of the present application.

BACKGROUND OF THE INVENTION

1. Field of the Invention

The present invention relates generally to communications systems and, more specifically, the present invention relates to wireless communications systems employing antenna arrays.

2. Background Information

Antenna arrays may be used in communications systems that transmit and/or receive radio frequency signals. Antenna arrays typically include a number of antennas that are spatially separated and may be employed in a number of different wireless applications including radio communications systems, cellular systems, television broadcasting, point to point systems, paging systems, medical applications or the like.

The use of antenna arrays in such systems often provide antenna performance improvements over the use of a single element antenna. These antenna performance improvements may include for received signals improved signal to noise ratio and interference rejection. Antenna performance improvements for transmitted signals may include improved directionality and hence less power towards other co-channel users, security and reduced transmit power requirements. Antenna arrays may be used for signal reception only, for signal transmission or for both signal reception and transmission.

A typical application of antenna array systems is in a wireless communication system. Examples include a cellular communication system and a wireless local loop system. Such wireless communications systems typically include one or more communications stations, generally called based stations, each communicating with its subscriber units, also called remote terminals and handsets. In cellular systems, the remote terminal is typically mobile, while in wireless local loop systems, the remote unit is typically in a fixed location.

The antenna array is typically at the base station, but may also be employed at a user terminal. Communication from the remote terminal to the base station is typically called the uplink and communication from the base station to the remote terminal is typically called the downlink. In time division duplex (TDD) systems, uplink and downlink communications with a particular remote terminal occur at the same frequency, but at different time slots. In frequency division duplex (FDD) systems, uplink and downlink communications with a particular remote terminal occur at different frequencies and may or may not occur at the same time.

Since different frequencies are used in the uplink and downlink communication channels in FDD, the behavior of the signals in the uplink and downlink communication channels between the base station and remote terminal are different. The differences are more apparent as the channels have more multipath components. In a multipath environment, scattering and/or reflections caused by, for example, buildings or the like result in amplitude and phase changes and/or multipath components in the communication signals. Multipath components behave differently for different frequencies and a communication signal arriving at an antenna array changes with the frequency. This makes downlink beamforming more challenging for FDD systems than TDD systems since the uplink and downlink frequencies are the same in TDD systems. Accordingly, the performance of a wireless communications system is impacted by the presence of scatterers in the environment.

Another factor that impacts wireless communication system performance is the presence of multiple remote terminals utilizing the same frequency or channel at the same time in the environment. As the number of separate sources or remote terminals utilizing the same frequency increases, the amount of interference in the communications channel also increases.

SUMMARY OF THE INVENTION

A downlink beamforming apparatus and method are disclosed. In one embodiment, a method in accordance with the teachings of the present invention includes receiving uplink communication signals from a plurality of antenna array elements, selecting an operating condition of an environment and estimating downlink beamforming weights used in downlink communication signals in response to the selected operation condition of the environment. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

In one aspect of the present invention, methods and apparatuses for estimating downlink beamforming weights based on an operating condition or environment of a communications system are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

In one aspect of the present invention, a base station in a wireless communication system is provided with the ability to estimate an environment or condition in which the wireless communication system is operating. The methods used to estimate downlink beamforming weights for downlink communication signals from the base station to the remote terminals are estimated depending upon operating conditions. For instance, in one embodiment, downlink beamforming weights are estimated differently depending on whether a low clutter, high clutter low interference or high clutter high interference environment is estimated.

In one embodiment, the base station includes an antenna array having a plurality of antenna elements. Uplink communication signals are received by the antenna elements in the antenna array and processing is performed on the uplink communication signals to estimate whether the base station is operating in a low clutter, high clutter low interference environment or a high clutter high interference environment. After the environment is estimated, downlink beamforming weights used in downlink communications are then estimated based on the estimated environmental conditions.

Figure 1:
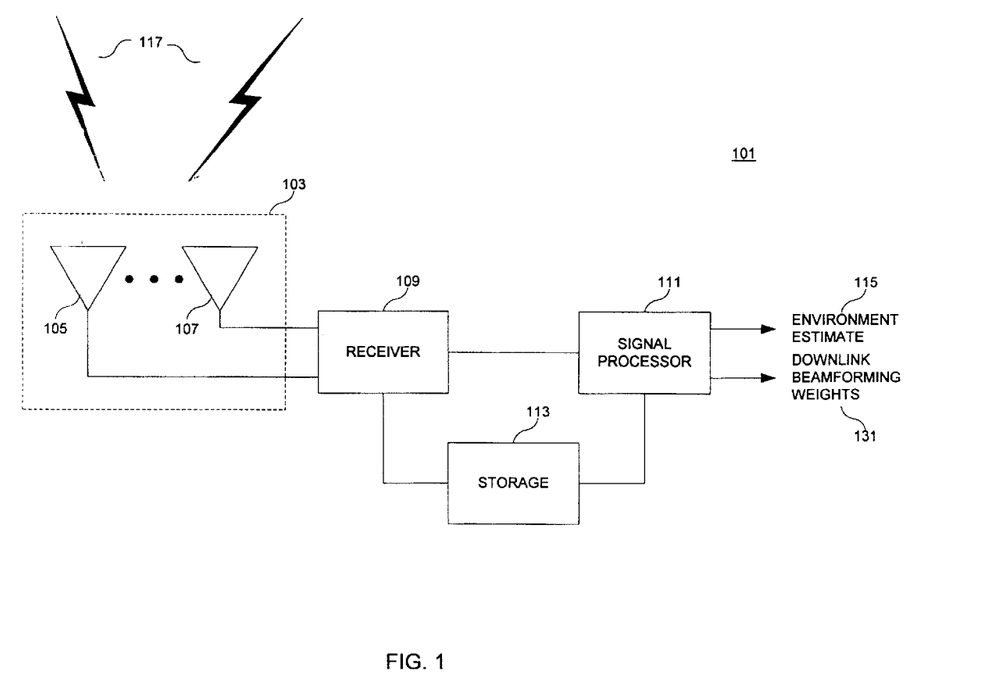
FIG. 1 is a block diagram illustration of one embodiment of a base station in accordance with the teachings of the present invention.

To illustrate, FIG. 1 is a block diagram illustration of one embodiment of a base station 101 of a wireless communication system in accordance with the teachings of the present invention. As shown, base station 101 includes an antenna array 103 having a plurality of antenna elements 105 and 107. It is appreciated that although antenna array 103 is illustrated having two antenna elements 105 and 107 in FIG. 1 for explanation purposes, antenna array 103 may include more than two antenna elements in accordance with the teachings of the present invention. As illustrated, uplink communication signals 117 are received by the antenna elements 105 and 107 of antenna array 103. In one embodiment, the uplink communication signals 117 are received from one or more remote terminals of a wireless communication system.

In the depicted embodiment, a receiver 109 is coupled to receive uplink communication signals 117 from the antenna elements 105 and 107 of antenna array 103. In one embodiment, signal processor 111 is coupled to receiver 109 to receive the uplink communication signals 117. In one embodiment, storage 113 is coupled to receiver 109 to store the uplink communication signals 117 received by receiver 109 and signal processor 111 is coupled to storage 113 to receive the stored communication signals. In one embodiment, storage 113 is a machine-readable medium in which software instructions that may be executed by signal processor 111 are stored.

As shown in the embodiment illustrated in FIG. 1, signal processor 111 processes the received uplink communication signals 117 and generates an environment estimate 115 in response to the received uplink communication signals 17. In one embodiment, environment estimate 115 may be an estimate of a low clutter environment, a high clutter low interference environment or high clutter high interference environment.

It is noted that various devices, methods and/or techniques for estimating an environment such as environment estimate 115, which may be employed with embodiments of the present invention are disclosed in co-pending application Ser. No. 09/668,664, filed Sep. 22, 2000, entitled "Method and Apparatus For Determining An Operating Condition In A Communications System," and assigned to the Assignee of the present application.

In one embodiment, signal processor 111 then estimates downlink beamforming weights 131 used for downlink communication signals. In one embodiment, the methods and/or techniques used to estimate beamforming weights 131 are based upon environment estimate 115. For instance, in one embodiment a first technique is used to estimate downlink beamforming weights 131 if a low clutter environment is estimated in environment estimate 115. A second technique is used to estimate downlink beamforming weights 131 if a high clutter low interference environment is estimated in environment estimate 115. A third technique is used to estimate downlink beamforming weights 131 if a high clutter high interference environment is estimated in environment estimate 115.

Figure 2:
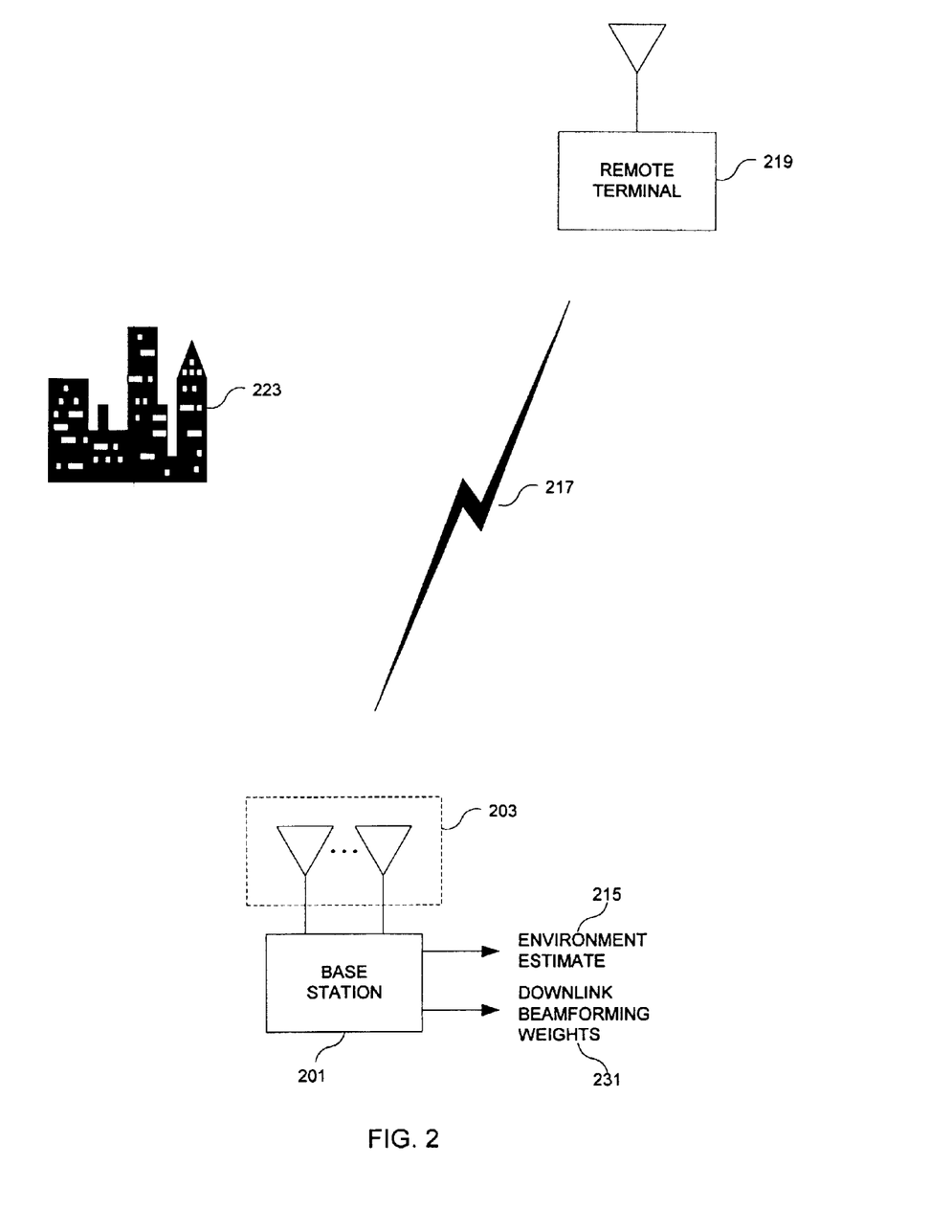
FIG. 2 is a block diagram illustration of one embodiment of a base station operating in a low clutter environment in accordance with the teachings of the present invention.

To illustrate, FIG. 2 is a block diagram illustration of one embodiment of a base station 201 operating in a low clutter environment in accordance with the teachings of the present invention. For purposes of this specification, a low clutter environment corresponds to an environment in which there are relatively few scatterers or the like, which may cause multipath components. Such an environment may be found in for example a suburban environment, which may be characterized by one or two storeyed buildings. In some cases, there may be a line of sight between the base station and the remote terminal.

As illustrated in FIG. 2, base station 201 includes an antenna array 203 receiving uplink communication signals 217 from remote terminal 219. In one embodiment, base station 201 may be part of a cellular base station or the like and remote terminal may be a mobile unit that is part of a cellular phone or the like. However, it should be appreciated that the present invention is not limited to any particular type of wireless application, such as for example cellular systems, but may be utilized in various types of wireless systems and applications employing antenna arrays. In one embodiment, the present invention is useful in spatial division multiple access systems (SDMA) or other types of systems in which adaptive arrays may be employed. For example, one embodiment of the present invention maybe utilized in time division duplex (TDD) or especially frequency division duplex (FDD) communication systems and/ or in conjunction with other wireless architectures. Furthermore, each or a combination of the various elements of embodiments of the present invention may be implemented in hardware, software, or a combination thereof.

Referring back to FIG. 2, although there are scatterers 223 are present in the environment, there are relatively few, and therefore the environment depicted in FIG. 2 is an illustration of a low clutter environment. From a propagation point of view, the communication channel between base station 201 and remote terminal 219 is benign. In one embodiment, base station 201 receives uplink communication signals 217 through antenna array 203. Base station 201 processes the uplink signals 217 and generates an environment estimate 215, which in FIG. 2 is an estimate of a low clutter environment. In one embodiment, base station 201 also estimates downlink beamforming weights 231 used for downlink communication signals in response to uplink signals 217 and environment estimate 215.

Figure 3:
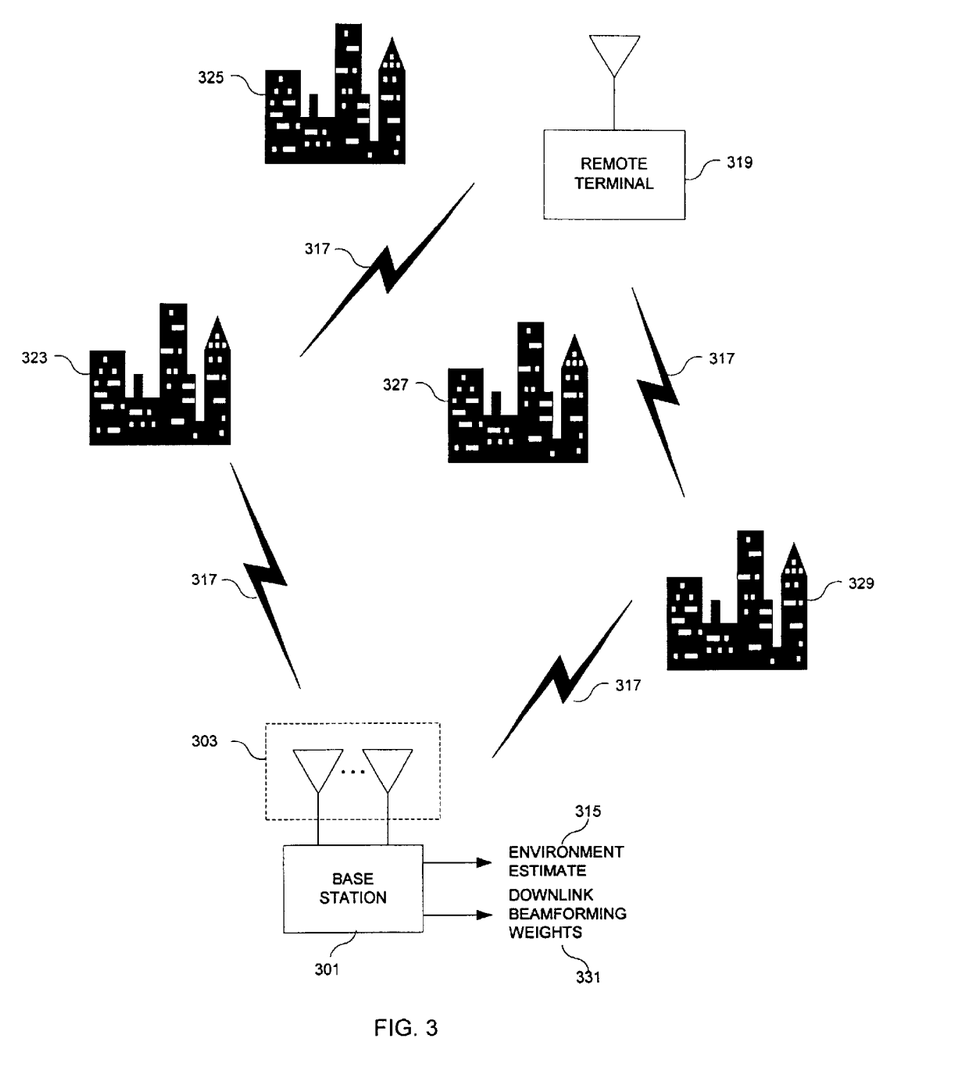
FIG. 3 is a block diagram illustration of one embodiment of a base station operating in a high clutter and low interference environment in accordance with the teachings of the present invention.

FIG. 3 is a block diagram illustration of one embodiment of a base station 301 operating in a high clutter low interference environment in accordance with the teachings of the present invention. For purposes of this specification, a high clutter environment corresponds to an environment in which there is a relatively large amount of scatterers or the like, which may cause multipath components. One example of such an environment may be an urban environment, which may be characterized by tall buildings and the propagation environment is relatively harsh. Line of sight propagation conditions are generally absent in high clutter environments. Urban or high clutter environment propagation channels usually include multiple propagation paths and do not include a dominant path, as in suburban environments. Accordingly, there is typically a significant angle of arrival spread of incoming uplink signals in high clutter environments. For purposes of this specification, a low interference environment corresponds to an environment in which there are relatively few sources or remote terminals utilizing the same frequency or channel at the same time.

As illustrated in FIG. 3, base station 301 includes an antenna array 303 receiving uplink communication signals 317 from remote terminal 319. As shown in FIG. 3, there are a relatively large number of scatterers present, including scatterers 323, 325, 327 and 329. The relatively large number of scatterers introduce many multipath components in the uplink communication signals 317. Accordingly, the environment illustrated in FIG. 3 is a high clutter environment. In addition, the example illustrated in FIG. 3 shows relatively few remote terminals, one of which is illustrated with remote terminal 319, and therefore the depicted environment is an example of a low interference environment.

In one embodiment, base station 301 receives uplink communication signals 317 through antenna array 303. Base station 301 processes the uplink signals 317 and generates an environment estimate 315, which in FIG. 3 is an estimate of a high clutter low interference environment. In one embodiment, base station 301 also estimates downlink beamforming weights 331 used for downlink communication signals in response to uplink signals 317 and environment estimate 315.

Figure 4:
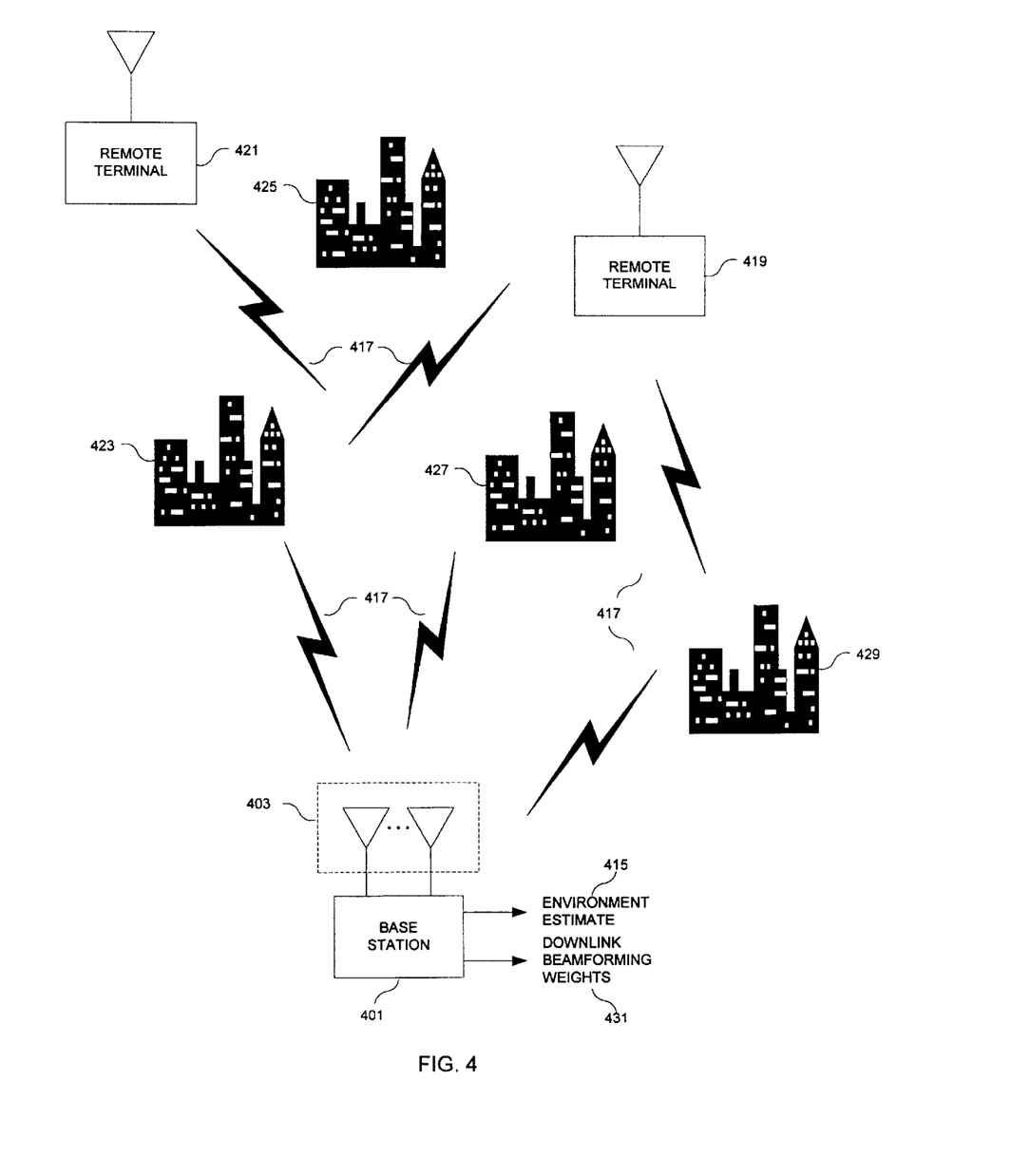
FIG. 4 is a block diagram illustration of one embodiment of a base station operating in a high clutter and high interference environment in accordance with the teachings of the present invention.

FIG. 4 is a block diagram illustration of one embodiment of a base station 401 operating in a high clutter high interference environment in accordance with the teachings of the present invention. For purposes of this specification, a high interference environment corresponds to an environment in which there is a relatively large number of sources or remote terminals utilizing the same frequency or channel at the same time. One example of such an environment may be an environment in which there are many wireless phone users using the same channel such as for example in a busy downtown or airport environment.

As illustrated in FIG. 4, base station 401 includes an antenna array 403 receiving uplink communication signals 417 from many remote terminals, including remote terminals 419 and 421. As shown in FIG. 4, there are a relatively large number of scatterers present, including scatterers 423, 425, 427 and 429. The relatively large number of scatterers introduce many multipath components in the uplink communication signals 417. Accordingly, the environment illustrated in FIG. 4 is a high clutter environment. In addition, the example illustrated in FIG. 4 a relatively large number of remote terminals, two of which are illustrated with remote terminals 419 and 421, and therefore the depicted environment is an example of a high interference environment.

In one embodiment, base station 401 receives uplink communication signals 417 through antenna array 403. Base station 401 processes the uplink signals 417 and generates an environment estimate 415, which in FIG. 4 is an estimate of a high clutter high interference environment. In one embodiment, base station 401 also estimates downlink beamforming weights 431 used for downlink communication signals in response to uplink signals 417 and environment estimate 415.

Figure 5:
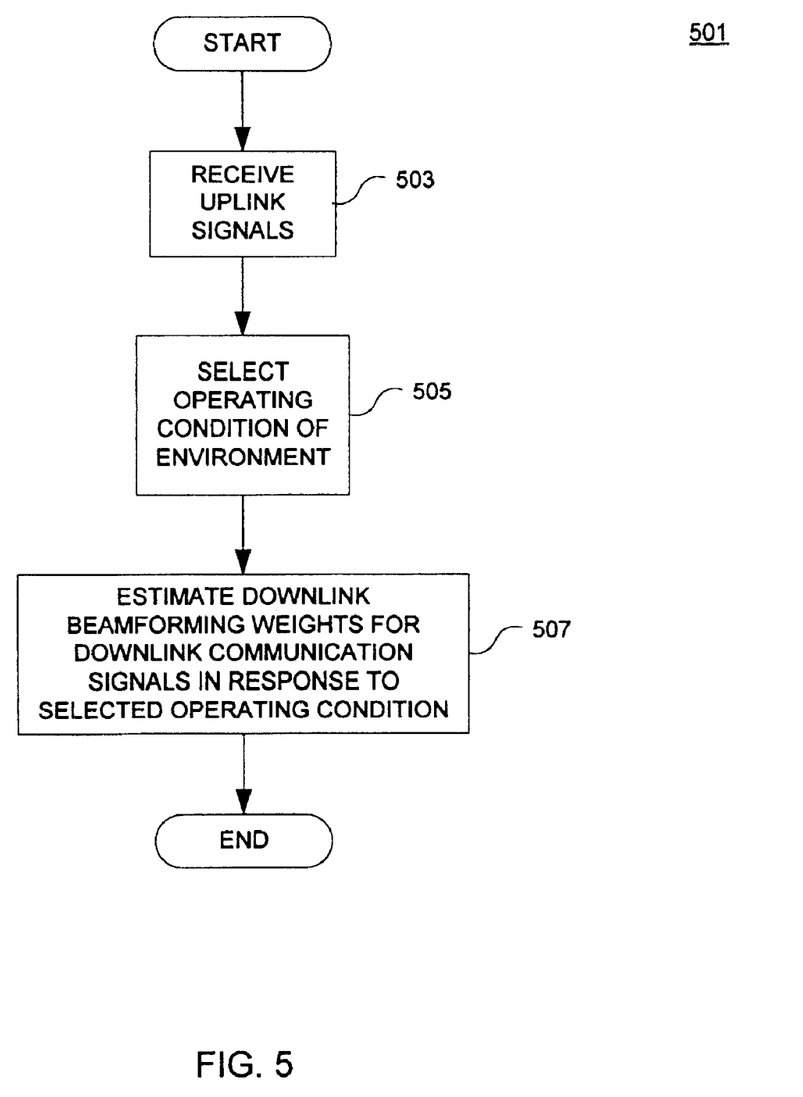
FIG. 5 is a flow diagram illustrating one embodiment a method for downlink beamforming in accordance with the teachings of the present invention.

One embodiment of a method for estimating downlink beamforming weights for downlink communication signals from a base station to a remote terminal is illustrated generally in a flow diagram 501 illustrated in FIG. 5. The method illustrated in the flow diagram 501 of FIG. 5 may be practiced by a base station such as for example those illustrated in FIGS. 1 through 4 above. As shown in block 503, uplink signals are received by for example the plurality of antenna elements 105 and 107 of antenna array 103 of FIG. 1. In one embodiment, the uplink signals are provided to receiver 103 and are then provided to signal processor 111. In one embodiment, the uplink signals are stored in storage 113 and are then provided to signal processor 111. In another embodiment, uplink signals are received directly from receiver 109.

In one embodiment, block 505 shows that the environment is then selected. As mentioned previously, some examples of methods and/or techniques used to estimate the operating condition of the environment are described in co-pending application Ser. No. 09/668,664, filed Sep. 22, 2000, entitled "Method and Apparatus For Determining An Operating Condition In A Communications System," and assigned to the Assignee of the present application.

Block 507 shows that downlink beamforming weights are then generated in one embodiment responsive to the selected operating condition generated for example in block 505. In one embodiment, the downlink beamforming weights generated in block 507 may be employed by those skilled in the art having the benefit of this disclosure to generate downlink communication signals from a base station to a remote terminal.

Figure 6:
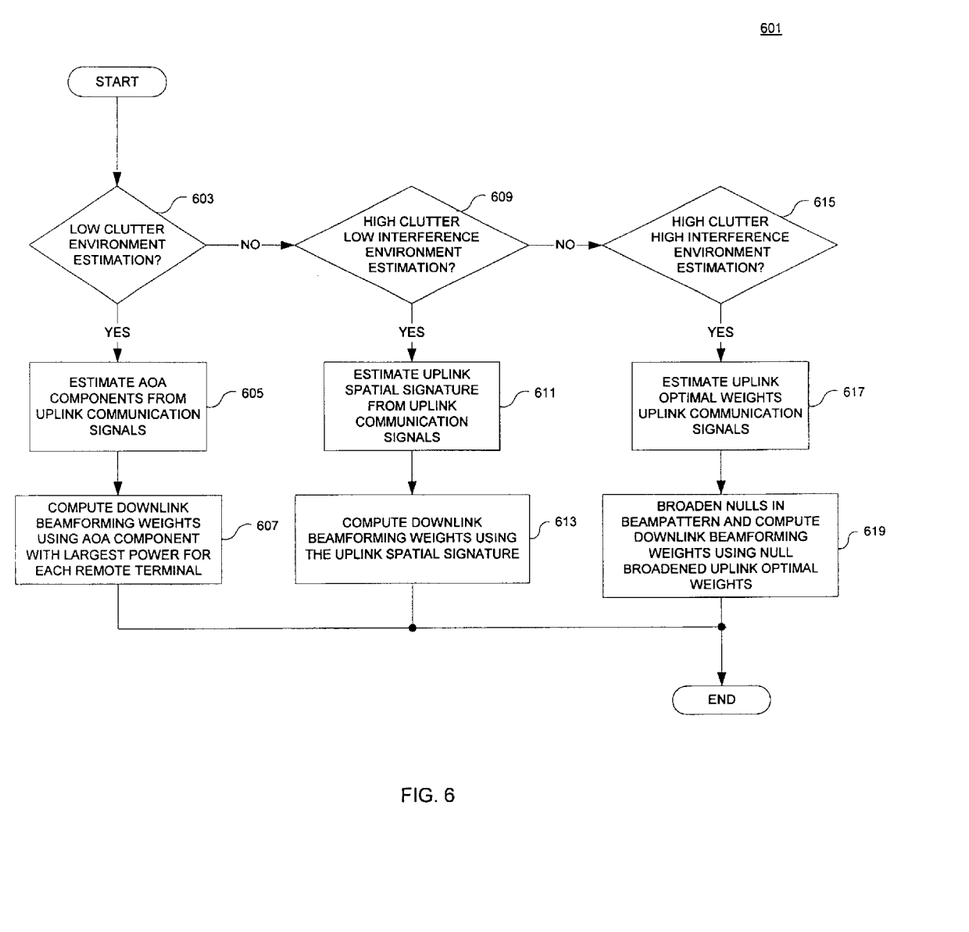
FIG. 6 is a flow diagram illustrating one embodiment of estimating downlink beamforming weights in response to environmental conditions in accordance with the teachings of the present invention.

To illustrate, FIG. 6 is a flow diagram 601 illustrating one embodiment of a method of generating downlink beamforming weights used for downlink communication signals in accordance with the teachings of the present invention. As shown with block 603, a first approach is used to estimate downlink beamforming weights if there is a low clutter environment estimation. In one embodiment, if a low clutter environment is estimated according to block 603, channel information derived from uplink communication signals is used for downlink spatial processing. In example, in one embodiment, block 605 shows that an angle of arrival (AOA) is estimated from uplink communication signals in if there is a low clutter environment estimation. In one embodiment, downlink beamforming weights are then calculated based on the estimated AOA as shown in block 607.

In one embodiment, well-known techniques may be utilized to estimate the AOA. Known AOA estimation techniques that may be utilized in accordance with the teachings of the present invention include for example the Delay and Sum method, Capon's method, Multiple Signal Classification (MUSIC) and Estimation of Signal Parameters via Rotational Invariance Techniques (ESPRIT).

The Delay and Sum method is also referred to as a classical beamformer method or Fourier method. The beamformer uses a weight, w, which is the spatial signatures for any given angle, $\theta$. Thus, w=a($\theta$). The output power of the beamformer is calculated for each azimuthal angle. The AOA corresponding to the largest output power is declared as the source AOA. This known technique produces broad beams.

Capon's known method forms a beam in the look angle, $\theta$, but it also tries to null uncorrelated interference. This is achieved by minimizing the output power subject to the constraint that a beam is formed in the direction of the look angle such that $$\min_w E[y(k)]^2 = \min_w w^H R_{zz} w \qquad (Eq. 1)$$

subject to $$w^H a(\theta) = 1 \qquad (Eq. 2)$$

where y is the output, w is the weight vector, H represents a Hermitian transpose and $R_{zz}$ is the input correlation matrix. The output power spectrum as a function of AOA is given by $$P_{Capon}(\theta) = 1/(a^H R_{zz} a(\theta)). \qquad (Eq. 3)$$

The known MUSIC technique is a high resolution algorithm that exploits the Eigen structure of the input covariance matrix. MUSIC is a signal parameter estimation algorithm that estimates the number of incident signals, their AOAs, their strengths and the cross correlations between the incident signals. The Eigen vectors of the covariance matrix belong to either of the two orthogonal subspaces: signal subspace or noise subspace. The steering vector corresponding to the AOA of the signals lie in the signal subspace and hence orthogonal to the noise subspace. By searching through all possible array steering vectors that are perpendicular to the space spanned by the Eigen vectors of the noise subspace, the AOAs are estimated.

The known ESPRIT technique is another subspace technique that reduces the computation and storage requirements for MUSIC. ESPRIT does not require an exhaustive search or precise calibration. ESPRIT derives its advantages by utilizing array elements that have a structure that can be decomposed into two equal sized identical subarrays with corresponding elements of the two subarrays being displaced from one another by a fixed translational, not rotational, distance.

All of the above-described AOA techniques assume that the antenna arrays are calibrated, i.e., all variations due to the antenna, receiver and transmitter chains are removed. For a uniform linear array, the spatial signature for the uplink for a particular incident angle ($\theta$) can be written as $$a_u(\theta) = [1 e^{j2\pi d \cos(\theta)/\lambda_u} \ldots e^{j2\pi(M-1)d \cos(\theta)/\lambda_u}]^T \qquad (Eq. 4)$$

where d is the inter-element spacing, $\lambda_u$ is the uplink wavelength, M is the number of elements in then antenna array. In one embodiment, the downlink spatial signature is obtained by substituting the uplink wavelength ($\lambda_u$) with the downlink wavelength ($\lambda_d$) to be used in downlink communication signals.

In the uplink communication signals, there may be multiple AOA components associated with a remote terminal. In one embodiment, the AOA associated with each remote terminal is separated from the other and the downlink weight is estimated as follows. First, the number of sources is estimated using a known order estimation algorithm, such as for example Akaike Information Criteria (AIC), Minimum Descriptive Length (MDL) or the like. Next, the uplink spatial signatures of the various remote terminals are separated using known techniques such as for example the Iterative Least Squares Projection (ILSP) method or the like. Then, the AOA estimation algorithms are applied on the estimated uplink spatial signature and AOAs associated with each remote terminal are estimated. The dominant AOA associated with each remote terminal is then chosen and the downlink beamforming weights are formed using the following equation:

$$w_i = (A^H A)^{-1} a_i \qquad (Eq. 5)$$

where w is the downlink beamforming weight vector, the A matrix includes the downlink spatial signatures of all the remote terminals, H represents a Hermitian transpose and $a_i$ is the downlink spatial signature of the ith remote terminal. Accordingly, in one embodiment of the present invention, only the AOA component with the largest power is used to compute the downlink beamforming weight. Thus, $w_i$ represents the downlink beamforming weights estimated for a downlink communication signals in a low clutter environment in accordance with the teachings of the present invention.

Referring back to flow diagram 601 of FIG. 6, block 609 illustrates that a second approach is used to estimate downlink beamforming weights if there is a high clutter low interference environment estimation. In one embodiment, if a high clutter low interference environment is estimated according to block 609, block 611 shows that uplink spatial signatures are then estimated. According to block 613, downlink beamforming weights are then calculated based on the uplink spatial signature.

In one embodiment, the uplink spatial signatures in the case of a high clutter low interference environment are not estimated from the uplink communication signals AOA, but rather by correlating the input array signal with a reference signal. Accordingly, the estimated uplink spatial signature is estimated as follows:

$$\hat{a}_u = r_{zs} = [Z^H s]_{M \times 1} \qquad (Eq. 6)$$

where $\hat{a}_u$ is the estimated uplink spatial signature and $r_{zs}$ is the correlation between the input array signal Z and the reference signal s. H represents a Hermitian transpose and M is the number of elements in then antenna array. In one embodiment, the downlink beamforming weights in the case of a high clutter low interference environment are then estimated according as follows:

$$w_d = \hat{a}_u^* \qquad (Eq. 7)$$

where $w_d$ represents the downlink beamforming weights estimated for a downlink communication signals in a high clutter low interference environment in accordance with the teachings of the present invention.

Referring back to flow diagram 601 of FIG. 6, block 615 illustrates that a third approach is used to estimate downlink beamforming weights if there is a high clutter high interference environment estimation. In one embodiment, if a high clutter high interference environment is estimated according to block 615, block 617 shows that uplink optimal weights are then estimated. In one embodiment, the AOA of the desired remote terminals and interferers are then estimated from the uplink beam pattern. As shown in block 619, in one embodiment, downlink beamforming weights are then estimated by broadening the nulls directed towards the interferers using known null broadening techniques. Accordingly, increased power is directed to the desired remote terminal and reduced power is directed to interferers.

For instance, in one embodiment, uplink optimal weights are calculated according to the following:

$$w_{[M \times 1]} = R_{zz}^{-1} r_{zs} \quad \text{(Eq. 8)}$$

where w is an M×1 matrix representing the uplink optimal weights, M is the number of elements in then antenna array. $R_{zz}$ is a correlation matrix calculated according to the following:

$$R_{zz} = [Z'Z]_{M \times M} \quad \text{(Eq. 9)}$$

and $r_{zs}$ is a correlation vector calculated according to the following:

$$r_{zs} = [Z\ s]_{M \times 1} \quad \text{(Eq. 10)}$$

where Z represents a matrix representing the received uplink communications signal, s represents a reference signal and M is the number of elements in then antenna array.

In one embodiment, after the uplink optimal weights $w_{[M \times 1]}$ are estimated, an uplink beampattern may then be formed using techniques known to those skilled in the art having the benefit of this disclosure. As is known to those skilled in the art, nulls located in the uplink beampattern correspond to interferers. In one embodiment, the nulls located in the uplink beampattern are then broadened using known techniques and then downlink beamforming weights are then determined for the high clutter high interference environment in accordance with the teachings of the present invention. As is known to those skilled in the art, nulls in the beampattern correspond to AOAs of interferers. Therefore, by broadening the nulls in the beampattern at the AOAs of the interferers, reduced power is directed to interferers in downlink communication signals generated from the downlink beamforming weights in accordance with the teachings of the present invention. In another embodiment, is appreciated that the null broadening techniques to reduce power directed toward interferers may be used in environmental conditions other than high clutter high interference in accordance with the teachings of the present invention.

In the foregoing detailed description, including what is described in the Abstract, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. The description and abstract are not intended to be exhaustive or to limit the present invention to the precise forms disclosed.

The terms used in the following claims should not be construed to limit the invention to the specific embodiments disclosed in the specification. Rather, the scope of the invention is to be determined entirely by the following claims, which are to be construed in accordance with the established doctrines of claim interpretation.

What is claimed is:

1. A method, comprising:
   receiving uplink communication signals from a plurality of antenna array elements;
   estimating an operating interference condition of an environment in response to receiving the uplink communication signals;
   selecting a downlink beamforming weight estimation strategy in response to the estimated operating condition; and
   estimating, with the selected estimation strategy, downlink beamforming weights to use in downlink communication signals, wherein the beamforming weights are estimated in response to one of: channel information derived from the uplink communication signals if a low clutter environment is the estimated operating condition, an uplink spatial signature of the uplink communication signals if a high clutter low interference environment is the estimated operating condition, and uplink optimal weights of the uplink communication signals if a high clutter high interference environment is the estimated operating condition.

2. The method of claim 1 wherein estimating the downlink beamforming weights comprises using angles of arrival (AOAs) estimated from the uplink communication signals received from the plurality of antenna array elements if a low clutter environment is the estimated operating condition.

3. The method of claim 1 wherein estimating the downlink beamforming weights comprises estimating the uplink spatial signature by performing a correlation between the received uplink communication signals and the reference signal if a high clutter low interference environment is the estimated operating condition.

4. The method of claim 1 wherein estimating the downlink beamforming weights, if a high clutter high interference environment is the estimated operating condition, comprises:
   estimating the uplink optimal weights from uplink communication signals received from the plurality of antenna array elements;
   estimating angles of arrival (AOAs) corresponding to desired remote terminals and interferers; and
   broadening nulls directed towards the interferers.

5. The method of claim 1 wherein the uplink and downlink communications signals are included in a spatial division multiple access (SDMA) communications system.

6. The method of claim 1 wherein the uplink and downlink communications signals are included in a time division duplex (TDD) communications system.

7. The method of claim 1 wherein the uplink and downlink communications signals are included in a frequency division duplex (FDD) communications system.

8. The method of claim 1 wherein the uplink communications signals are received by the plurality of antenna array elements from one or more remote terminals.

9. An apparatus, comprising:
   a plurality of antenna elements;
   a receiver coupled to receive uplink communication signals from the plurality of antenna elements; and
   a signal processor coupled to estimate an operating interference condition of an environment in response to the received uplink communication signals and select a downlink beamforming weight estimation strategy in response to the estimated operating condition, and estimate with the selected estimation strategy downlink beamforming weights to use in downlink communication signals, wherein the beamforming weights are estimated in response to one of: channel information derived from the uplink communication signals if a low clutter environment is the estimated operating condition, an uplink spatial signature of the uplink communication signals if a high clutter low interference environment is the estimated operating condition, and uplink optimal weights of the uplink communication signals if a high clutter high interference environment is the estimated operating condition.

10. The apparatus of claim 9 further comprising a memory coupled to the plurality of antenna elements to store the uplink communication signals received from the plurality of antenna elements.

11. An apparatus, comprising:
   means for receiving uplink communication signals from a plurality of antenna elements;
   means for storing the received uplink communication signals;
   means for estimating an operating interference condition of an environment;
   means for selecting a downlink beamforming weight estimation strategy in response to the estimated operating condition; and
   signal processing means for estimating downlink beamforming weights with the selected estimation strategy, wherein the beamforming weights are estimated in response to one of: channel information derived from the uplink communication signals if a low clutter environment is the estimated operating condition, an uplink spatial signature of the uplink communication signals if a high clutter low interference environment is the estimated operating condition, and uplink optimal weights of the uplink communication signals if a high clutter high interference environment is the estimated operating condition.

12. The apparatus of claim 11 wherein the means for estimating an operating condition of the environment is responsive to the uplink communication signals received from the plurality of antenna elements.

13. An article of manufacture comprising a machine-accessible medium having content to provide instructions to cause a machine to:
   receive uplink communication signals from a plurality of antenna array elements;
   estimate an operating interference condition of an environment in response to receiving the uplink communication signals;
   select a downlink beamforming weight estimation strategy in response to the estimated operating condition; and
   estimate, with the selected estimation strategy, downlink beamforming weights to use in downlink communications signals, wherein the beamforming weights are estimated in response to one of: channel information derived from the uplink communication signals if a low clutter environment is the estimated operating condition, an uplink spatial signature of the uplink communication signals if a high clutter low interference environment is the estimated operating condition, and uplink optimal weights of the uplink communication signals if a high interference environment is the estimated operating condition.

14. The article of manufacture of claim 13, further comprising the content to provide instructions to cause the machine to:
   store the uplink communication signals from the plurality of antenna array elements.

* * * * *